May 17, 1966 G. R. HAUSER ETAL 3,251,267
SPIN ROCKET AND LAUNCHER
Filed June 18, 1963 2 Sheets-Sheet 1
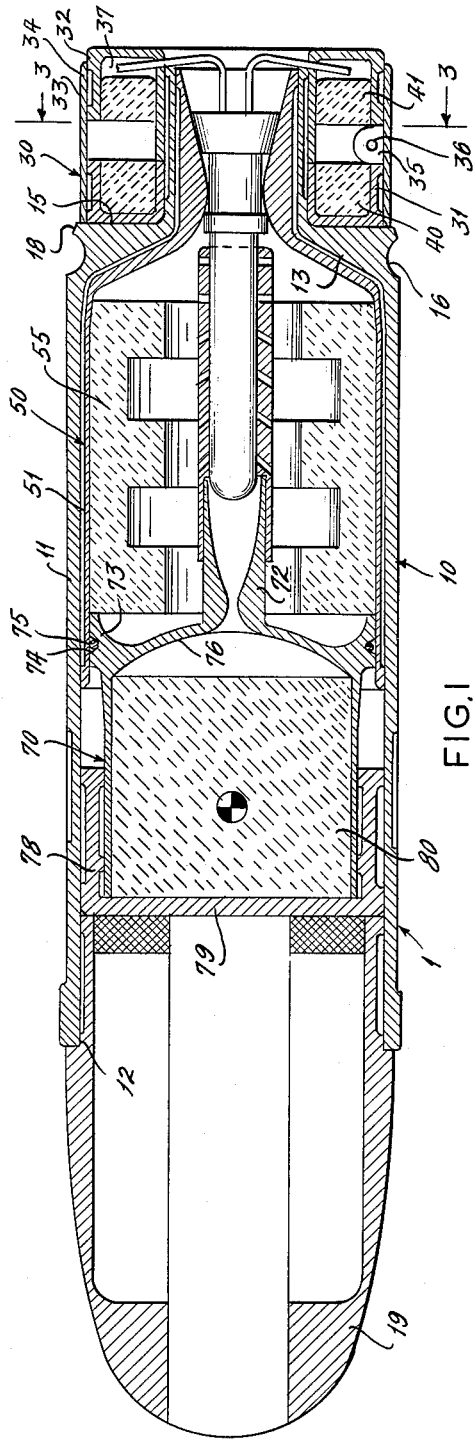
FIG.1
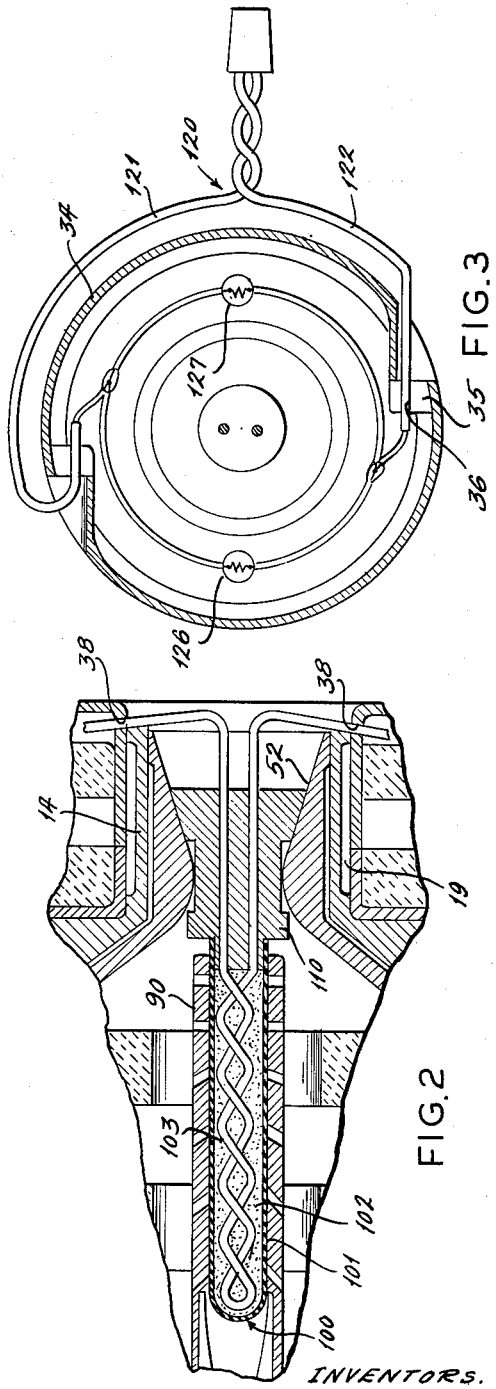
FIG.3
FIG.2
INVENTORS.
GEORGE R. HAUSER, WENDELL H. HUNTER,
JOHN F. HYNES, DONALD R. KELLER,
RAYMOND D. THURSTON & LEO J. MANDA
BY
ATTORNEY.

May 17, 1966     G. R. HAUSER ETAL     3,251,267
SPIN ROCKET AND LAUNCHER
Filed June 18, 1963     2 Sheets-Sheet 2
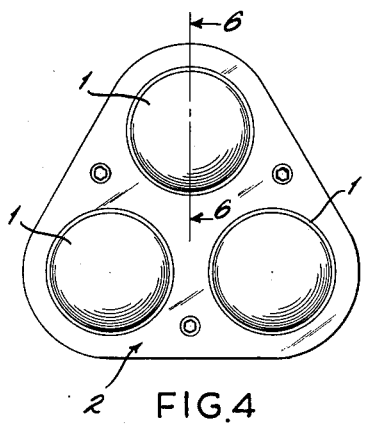
FIG.4
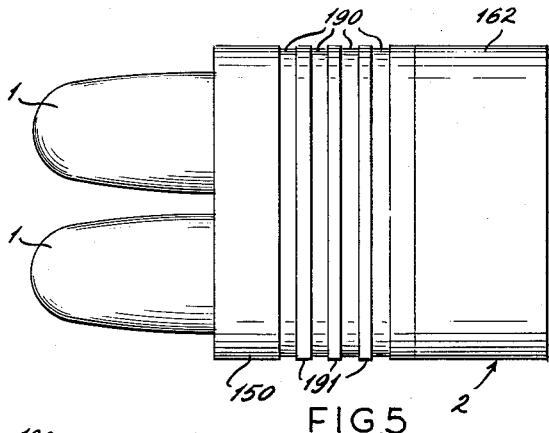
FIG.5
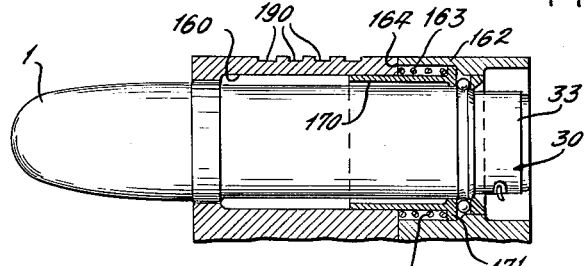
FIG.6
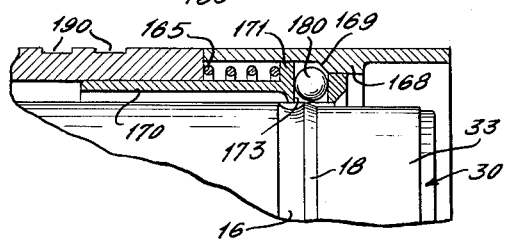
FIG.7
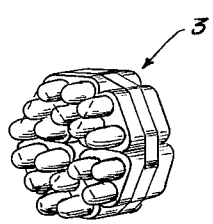
FIG.8
INVENTORS.
GEORGE R. HAUSER, WENDELL H. HUNTER,
JOHN F. HYNES, DONALD R. KELLER,
RAYMOND D. THURSTON Jr., LEO J. MANDA
BY 
ATTORNEY.

United States Patent Office 3,251,267
Patented May 17, 1966

3,251,267
SPIN ROCKET AND LAUNCHER
George R. Hauser, Creve Coeur, Wendell H. Hunter, St. John, John F. Hynes, St. Louis, and Donald R. Keller, Raymond D. Thurston, Jr., and Leo J. Manda, Florissant, Mo., assignors to Emerson Electric Co., a corporation of Missouri
Filed June 18, 1963, Ser. No. 288,779
7 Claims. (Cl. 89—1.7)

This invention relates to rockets which are stabilized by spinning them about a longitudinal axis.

In spinning rockets known heretofore, it has been customary either to utilize the main propellant, acting through canted nozzles, or against canted vanes, or, alternatively, to use a spin cartridge, which is separated from the rocket during the launching. In either case, however, a portion of the thrust has been directed axially of the rocket.

The fact that an initial axial thrust is given the rocket has necessitated the use of holding mechanisms, closed ended launchers, long launching tubes or heavy mounting (blast) plates or the like to insure spin stabilization prior to free flight.

One of the objects of this invention is to provide a rocket which is more stable at launch than vane type rockets and rockets with canted main thrust nozzles by which spin is imparted to the rocket.

Another object is to provide such a rocket which requires only a lightweight launch tube, which can be short and open ended.

Another object is to provide such a rocket which attains a high rate of spin before any axial thrust is imparted to it.

Still another object of this invention is to provide such a rocket with an extended effective range.

Still another object of this invention is to provide a process of propelling a rocket more effectively than has been possible heretofore.

Other objects will become apparent to those skilled in the art in the light of the following description and accompanying drawing.

In accordance with this invention, generally stated, a generally cylindrical rocket is provided with at least three motors containing gas-producing charges. A first motor has ports tangential to a circle with its center on and lying in a plane perpendicular to the long axis of the rocket, and a spin charge in that motor. A second motor has an axially directed nozzle, and contains a propellant charge. A third motor has an axially directed nozzle and contains a sustaining charge. Ignition means are connected to ignite the spin charge first, and, subsequently, the propellant and sustaining charges.

The structure of the rocket permits it to perform the steps of the process of this invention, which include the spinning of the rocket from rest, without imparting an accelerating axial thrust to the rocket; thereafter imparting an axial thrust sufficient to accelerate the rocket to a desired flight speed, and thereafter imparting to the rocket a thrust sufficient to maintain a practically uniform velocity against the drag of the fluid through which the rocket is travelling.

Because of the structure of the rocket, and its method of use, a lightweight, simple launching package can be provided. The launching tubes, from which the rockets are launched can, if desired, be open ended, since no breach is required and can be short because the rocket is spin-stabilized before launching. Detent means are provided in the tubes, cooperating with detent means on the rockets, but only to maintain the rockets against accidental displacement of the tubes during their handling and transporting. Preferably, the housing from which the rockets are launched carries at least three rockets, and is equilaterally triangular in cross-section. The phrase "equilaterally triangular" has reference to the relationship of the sides of the package. They may be, and preferably are, rounded on their edges. Such a configuration makes for ready nesting into various combinations and shapes, so that the same package can be used for an individual launcher for an infantryman, or, in clusters, for helicopters, or land vehicles. Preferably, simple firing contact means are provided, to permit the selective firing of barrages or clusters utilizing the straps by which the rocket packages are bound together.

In the preferred embodiment, the rocket is made up with a case, generally cylindrical in transverse cross-section, and having a neck at its rear end. An annular spin motor is secured to the outside surface of the neck and contains the spin charge. The second, propellant, motor has a nozzle extending closely within the neck of the case, and, integral with the nozzle, an enlarged propellant charge-containing section fitting closely within the case and secured to it. The propellant charge in the second motor is in the form of an open-ended hollow cylinder. The third motor also has a nozzle, which extends within the compass of the propellant charge in the second motor. The rear wall of the third, sustainer, motor constitutes the forward wall of the second motor. A closure member than completes the third motor.

Reference has been made heretofore to tangential ports of the first, spin, motor. These ports are tangential to a circle of which the long axis of the rocket is the center. The ports are, more properly, chordal with respect to the outside wall of the case and first motor.

In the preferred embodiment, the aperture of the nozzle of the sustainer motor is considerably smaller than the aperture of the nozzle of the propellant motor.

In the preferred embodiment of the detent, each rocket is provided, near the rear end of the case, with a shoulder, in which there is an annular channel, arcuate in cross-section. This channel is a race-way or bearing surface for balls which are normally caged in caging slots in a sleeve within a rocket retaining tube. The sleeve is slidably mounted and biased to a position at which the balls are retained within the caging slots and in the channel, by a shouldered part in the tube. When an axial thrust is given the rocket by the propellant charge, the rocket, moving against the bias of the sleeve, moves the sleeve to a position at which the balls are permitted to move radially outwardly to clear the bearing surface defining the channel in the rocket case, and free the rocket.

In the drawing, FIGURE 1 is a longitudinal sectional view of one embodiment of rocket of this invention;

FIGURE 2 is an enlarged, fragmentary view of a part of the rocket shown in FIGURE 1, with a primer cartridge assembly shown in longitudinal section;

FIGURE 3 is a sectional view taken along the line 3—3 of FIGURE 1;

FIGURE 4 is a view in front elevation of one embodiment of rocket package of this invention;

FIGURE 5 is a view in side elevation of the rocket package of FIGURE 4;

FIGURE 6 is a sectional view taken along the line 6—6 of FIGURE 4, showing a part of a rocket housing;

FIGURE 7 is an enlarged fragmentary detail view showing the detent mechanism of the embodiment of rocket illustrated, in rocket-release position; and FIGURE 8 is a view in perspective showing a cluster of rocket packages bound together to form a rocket launching unit.

Referring now to the drawing for one illustrative embodiment of this invention, reference numeral 1 indicates a rocket of this invention. In the embodiment shown, the rocket 1 is mounted in a pod 2. The pod and its contained rockets constitute a rocket package. Various combinations of rocket packages can be made, to form clusters, one of which, indicated by the numeral 3, is shown in FIGURE 8.

Referring now to FIGURE 1, the rocket 1 has a case 10, cylindrical in cross-section. The case 10 has a relatively thin cylindrical body 11, with a forwardly opening mouth 12. At its other end, the case 10 has a shoulder 13, of relatively heavy section, and an axially extending neck 14, projecting rearwardly. The shoulder 13 has an after radial face 15, and a circumferential channel 16, arcuate in cross-section, as shown in FIGURE 1, and with its after boundary defined by a rearwardly chamfered lip 18 of lesser radial extent than the cylindrical body 11 at the forward edge of the channel.

A warhead 19 is mounted in the mouth 12 of the case 10. The warhead is conventional, as far as this invention is concerned, and, per se, forms no part of the invention.

Mounted on the outside of the neck 14 of the case 10, is a first motor 30. In the embodiment shown, the first motor 30 is made in three parts: a forward toroidal cup 31, an after toroidal cup 32, and a spin nozzle ring 33. The forward toroidal cup 31 has its forward radial wall against the radial face 15, and an inner circumferential wall in contact with a part of the neck 14. The cup 31 opens rearwardly. The after toroidal cup 32 opens forwardly. It has one relatively axially long inner circumferential wall, which serves, when it abuts the inner circumferential wall of the forward cup 31, as a spacer, maintaining the outer circumferential walls of the two cups spaced an accurately predetermined axial distance from one another. Both the forward and after cups are secured to the neck 14 by means of adhesive in an adhesive channel 19 in the outer surface of the neck 14.

The spin nozzle ring 33 consists of an axially wide, radially thin band 34, with a pair of oppositely disposed nozzle bosses 35 inset as shown in FIGURE 3. Each of the nozzle bosses 35 has a spin port 36 extending entirely through it. The ports 36 lie in a plane perpendicular to the central axis of the ring 33 and case 10. They are directed along a projection of tangents to a circle, in that plane, with its center on the long axis of the ring and case.

A forward spin charge 40 is secured in the forward cup 31. An after spin charge 41 is secured in the after cup 32. A space 37 between the after spin charge 41 and the inner rear wall of the cup 32, is filled with a so-called slurry. Small holes 38, extend through the radially inner wall, of the after cup 32.

A second motor 50 includes a cylindrical thrust nozzle liner 51, and a heavy main thrust nozzle 52. The nozzle 52 is mounted within the neck 14 of the case 10. The nozzle liner 51 is mounted within the cylindrical body of the case 10. A tubular propellant charge 55, shaped on its inside surface to produce the desired burning characteristics, is secured within the nozzle liner 51. As is apparent from FIGURES 1 and 2, the nozzle liner 51 and the nozzle 52 are machined, on their outsides, to provide spacer-closure rings at each end, and a space over the entire outside surface, except for the ends, for the reception of adhesive, to bond the case 10 to the nozzle 52 and nozzle liner 51.

A third motor 70 includes a sustainer nozzle liner 71 and a sustainer nozzle 72. The sustainer nozzle liner 71 has a heavy flange 73, with an annular groove 74 in it, which serves as a seat for an O-ring 75. The flange 73 has a cylindrical outside surface dimensioned to fit closely within the forwardly opening mouth of the nozzle liner 51 of the second motor. A connecting wall 76, between the sustainer nozzle 72 and the flange 73, constitutes the rear wall of the third motor and the forward wall of the second motor.

A closure drum 78, has outside surfaces proportioned closely to fit inside the cylindrical body 11 of the case 10, and inside surfaces proportioned closely to receive the sustainer nozzle liner 71. The closure 78 has a relatively heavy, imperforate radial wall 79, to withstand the axial thrust of the various propellants. A solid block sustainer charge 80 is secured inside the sustainer nozzle liner 71.

The sustainer nozzle liner 71 is adhered to the closure drum 78, and the closure drum 78 is adhered to the inside surface of the cylindrical body 11 by means of adhesive in channels formed in the inner and outer circumferential surfaces of the axial wall of the closure drum 78.

A sustainer nozzle extender primer fire tube 90 is mounted, by means of a shrink fit, on the outside of, and axially aligned with the sustainer nozzle 72. The tube 90 has a multiplicity of variously directed ports through it. When the rocket is armed for firing, a primer cartridge 100 is mounted slidably in the tube 90. The cartridge 100, in the embodiment shown, consists of a frangible cartridge case 101, containing an ignition charge 102, in which is imbedded a fuse 103. The cartridge case 101 is mounted on the end of a spool-like plug 110, of resilient material, which fits snugly, but removably in the nozzle 52. The fuse 103 extends through passages in the plug 110, and, through the holes 38 in the wall of the first motor 30, into the slurry in the after cup 32, adjacent the after spin charge 41.

In the illustrative embodiment of rocket shown in FIGURE 3, a wiring harness 120 is provided, for igniting the spin charges 40 and 41. This harness includes two conductors, 121 and 122, one of which is connected to ground, and the other, when the rocket is fired, to a source of current. In FIGURE 3, the two wires 121 and 122 are shown as twisted together and capped, in short circuited condition, for safety during storage. These conductors 121 and 122 are electrically connected to opposite sides of a loop 123, with two resistance wire type igniters 126 and 127, electrically connected in the loop, between the conductors 121 and 122. In the embodiment shown the conductors 121 and 122 are led through the ports 36, and potted with a plastic mastic to provide a temporary seal before use.

Referring now to FIGURES 4 and 8, one illustrative embodiment of rocket package of this invention is shown. This package includes an elongated housing 150, equilaterally triangular in transverse cross-section, although its corners are rounded off. The housing 150 contains three tubes 160, each of which houses one rocket. The posterior section of the tubes is defined by a detent tube section 162, which has a forward area 163 of greater internal radius than the contiguous tube-defining part of the package, so as to define an annular abutment 164, against which a coil spring 165 bears. The detent tube also has a medial area 168, which, with the forward section 163 defines an annular sloping shoulder 169.

An axially slidable sleeve 170 is mounted in the tube 160. The sleeve 170 has a radially outwardly extending annular ledge 171 near its after end, but spaced axially forwardly thereof. The ledge 171 abuts the radially outer edge of the sloping shoulder 169, and, on its other side, bears against the end of the coil spring 165 opposite the abutment 164. The sleeve 170 is thus biased rearwardly by the spring 165. Between the ledge 171 and the rear edge of the sleeve 170, the sleeve is provided with a plurality of caging slots 173, extending radially through the sleeve.

When the rocket is loaded in the housing tubes and before firing, balls 180, caged in the caging slots 173, extend loosely into the rocket detent channels 16 in the shoulder 13 of the case 10, and are held there by the inner surface of the medial area 168 of the detent sleeve 162. This is illustrated in FIGURE 6. If the rocket is moved forward, it can be seen that the thrust of the rocket, transmitted to the sleeve 170 by the bearing of the balls 180 against the channel defining wall of the rocket, on the one side, and the caging slot defining wall of the sleeve on the other, moves the sleeve forward, permitting the balls to clear the beveled shoulder 169 and move radially outwardly to release the rocket, as shown in FIGURE 7.

In this embodiment of package, four grooves 190, providing three lands 191, encircle the housing 2. The bottom-defining walls of the grooves 190 may be coated with conductive material, one of which strips of conductive material can be connected to all of the ground wires of the rockets. The conductive strips in the other grooves can be connected electrically to the other conductors of the individual rockets, so that, by energizing the conductive strips selectively, one, two or three rockets can be fired on the first burst.

In FIGURE 8, a bundle of six packages is shown, bound together by a strap 200. The strap 200 may be made up of four separate conductors, lying in the four different grooves, so that, in a simple arrangement, six, twelve, or eighteen rockets can be fired in the first salvo. Suitable housing, such, for example, as a long tube, equipped with suitable stock and grip, holding one package, to permit the firing of the rockets, from the shoulder, by an infantryman, or a suitable housing for use in aircraft or land vehicles can be provided. Their design is routine, and they do not form a part of this invention. Similarly, suitable electrical connections from any suitable source, are conventional. Even in the package itself, conductors from the conducting strips in the channels 190 to appropriate clips or other terminals, to which the conductors 121 and 122 of the rockets are connected, can be of any conventional design.

Merely by means of illustration, one way of assembling the rocket of this invention will be described. The various motors may be assembled separately. In assembling the first motor, the spin charge 40 is cemented into the cup 31. The dummy pins are placed in the holes 38 of the cup 32, slurry is put into the bottom of the cup to the appropriate height and the spin charge 41 is cemented into the cup 32. The ends of the conductors 121 and 122 are led through the nozzle ports 36, to the interior of the ring 33, and electrical connection is made with the loop 124, as shown in FIGURE 3. For packing and shipping, before the rockets are installed for firing in a package, the other ends of the conductors 122 and 121 are twisted together to short then, and capped, also as shown in FIGURE 3. Adhesive is then placed in channels formed in the outer legs of the cups 31 and 32, as shown particularly in FIGURE 1, the cups are inserted from opposite sides into the ring band 34, and the entire assembly cured.

In assembling the second motor 50, it is only necessary to cement the propellant charge 55 in the nozzle liner 51.

In assembling the third motor 70, the nozzle extender 90 is shrunk onto the nozzle 73, the sustainer charge 80 is cemented onto the outside surface of the nozzle liner 71, all as is self-evident from FIGURE 1.

The first motor 30 is then cemented to the outside of the neck 14 of the case 10, with the forward radial wall of the cup 31 against the after radial wall of the shoulder 13 of the case.

The second motor is inserted through the open mouth of the case 10, and cemented in place with the nozzle within the neck 14.

The O-ring 75 is mounted in the channel 74 of the flange 73 on the nozzle liner 71 of the third motor, and the third motor is inserted through the open mouth of the case 10, with the sustainer nozzle 72 and nozzle extension 90 projecting axially through the center bore of the charge 55 in the second motor. The third motor 70 is cemented within the body 11 by means of adhesive in the adhesive receiving channel in the radially outer surface of the closure 78.

The warhead 19 is then mounted in the mouth 12 of the case 10.

Finally, the primer cartridge is inserted through the nozzle 52, into the extender 90, and the resilient closure plug 110 is pushed inwardly until its inner annular flange clears the most restricted portion of the nozzle 52 and its outer flange seats tightly against the wall of the nozzle rearwardly of the restriction. The ends of the fuse 103 (e.g. Pyrocore) are inserted into the wells left by the dummy pins, which are withdrawn, through the holes 38, as shown in FIGURES 2 and 3.

The installation of the rockets in the housing 2 can be facilitated if the detent sections 162 are made separate from the rest of the housing, although they can be joined by a web or spider constituting the back wall of the housing 2. With the detent sections removed, a rocket can be inserted from the forward end of a tube. The sleeve 170 can be put on the rocket from the rear end, with the spring 165 mounted on it, and the balls 180 in place in the caging slots. The detent section 162 can then be slipped over the sleeve 170 and rocket from the rear, and bolted into place. The conductors 121 and 122 can then be connected to suitable terminals, to make the package ready for installation in a projector or forming into bundles, the latter illustrated in FIGURE 8.

The method of operation of the rocket of this invention is as follows. Firing is initiated by energizing one of the conductors 121 and 122, and grounding the other. This sets off the spin charges 40 and 41. The products of combustion of these charges blow the conductors 121 and 122 out of the ports 36. The same products of combustion initiate the rotation of the rocket around its long axis. It can be seen, that since the ports 36 are directed tangentially to a circle which is in a plane at right angles to, and which has its center on the long axis of the rocket, the issuance of the gases through the nozzles 36 exerts no axial force upon the rocket. When the spin charge 41 has been substantially consumed, the burning of that charge ignites the fuse 103, which then, in turn, ignites the ignition charge 102 in the primer cartridge 101, rupturing the cartridge and projecting flaming gases through the ports in the extension 90, and through the aperture of the sustainer nozzle 72, igniting the propellant charge 55 and sustainer charge 80. It can be seen that the exposed surface area of the propellant charge 55 is much greater than that of the sustainer charge 80. Therefore, the burning rate of and the amount of gas generated by the propellant charge 55 will greatly exceed that of the sustainer charge 80. The generation of gases in the chambers 50 and 70 blows the resilient plug 110, and any remaining parts of the cartridge 101 out of the nozzle 52. The rocket is then accelerated to the desired flight speed by the escape of gas through the nozzle 52. During this period of acceleration, the propellant charge is of primary importance. When the propellant charge is burned out, the burning of the sustaining charge provides sufficient thrust, as long as the sustaining charge burns, to overcome the normal resistance of the air, maintaining a practically constant velocity of the rocket through that part of its flight between the time the propellant charge is burned out and the time the sustainer charge is burned out.

Of course, when the gases from the burning propellant charge first begin to exert a forward thrust on the rocket, the thrust is transmitted against the balls 180, hence against the sleeve 170, moving it forward against the bias of the spring 165 until the balls clear the shoulder 169, when they move radially outwardly to release the rocket. Since the balls 180 and the spring 165 are arranged symmetrically around the rocket, and the sleeve 170 is sufficiently well journaled to ensure that it moves axially without cocking, the release of the rocket is accomplished smoothly and without a tendency to cock the rocket.

Merely by way of illustration, and not by way of limitation, a rocket with the following dimensions and characteristics has been found to be satisfatcory. The rocket can be a little over 7 inches long and about 1¾ inches in diameter. The first motor can be about 9/10 of an inch long, over-all, and contain two charges, the total weight of which is about .026 pound. The inside diameter of the most restricted area of the main thrust nozzle 52 can be about .33 inch. and the diameter of the most restricted area of the sustainer nozzle can be about .06 inch. The total weight of the rocket loaded can be about one pound; the weight of propellant charge about .1 pound and that of the sustainer charge about .1 pound. The diameter of the spin nozzle ports can be about .09 inch.

The various parts of the rocket which have been described as "cemented" or "adhered" may be secured to one another by any of the adhesives such, for example, as epoxy resins, which are commonly used to fasten metallic parts to one another.

The construction of the rocket and its components may be such that in approximately 0.27 second after ignition, the spin charge has burned out and the rocket has attained a spin of about 20,000 r.p.m. (350 r.p.s.); after .49 second the propellant charge has burned out and the rocket has attained a velocity of 850 f.p.s. and a range of ninety feet, and after 3.77 seconds the sustainer charge has burned out, the rocket still has a velocity of about 850 f.p.s. and has a range of about 2900 feet.

Numerous variations in the construction of the various parts, within the scope of the appended claims, will occur to those skilled in the art in the light of the foregoing disclosure.

For example, in the preferred embodiment shown and described, the spin rate achieved before launch is the rate necessary to give the rocket stability through its entire flight and is, therefore, higher than necessary at the beginning of the flight, when the forward velocity is low. It is possible to reduce the size of the spin motor charge, to provide a pre-launch spin rate adequate to stabilize the rocket at launching, if ports are provided between the second motor chamber and the spin motor chamber so as to permit a small part of the propellant gases to bleed into the spin motor during flight. The issuance of these gases from the spin motor nozzle ports will accelerate the spin rate during flight. The amount of acceleration thus imparted will be a function of the size of the ports through which the propellant gases bleed so that a suitable rate can easily be accomplished. This is merely illustrative of such variation.

Having thus described the invention, what is claimed and desired to be secured by Letters Patent is:

1. A rocket for use within the earth's atmosphere, comprising a case generally cylindrical in transverse section, and having a neck at its rear end; an annular motor secured to the outside surface of said neck, containing a spin charge and having at least one pair of exhaust ports with the two ports of a pair being located on diametrically opposite sides of the rocket case in such a position that a plane drawn perpendicular to the thrust axis of one of said ports of said pair and passing through the long axis of said rocket will also be perpendicular to the thrust axis of the other of said ports, said ports being so oriented that the thrust direction of one of said ports of said pair is in a direction opposite to the thrust direction of the other of said ports, when viewed from an end of said rocket; a second motor having a nozzle section extending closely within the said neck and opening through said rear end and an enlarged propellant charge containing section, forward of the said neck and extending closely within said case and secured thereto, and a toroidal propellant charge mounted in said second motor; a third motor having a nozzle section extending within the compass of the propellant charge in the second motor and terminating axially forwardly of the nozzle section of the second motor, the rear wall of said third motor constituting the forward wall of the second motor, a sustainer charge mounted in said third motor, and a closure member for said third motor.

2. The rocket of claim 1 wherein the first and second motors and the closure member of the third motor are adhered to the casing.

3. The rocket of claim 1 wherein the third motor fits within the mouth of the second motor and seal means, bearing against the inside surface of the second motor, are provided between the second and third motors, and the third motor closure means includes an axially rearwardly extending circumferential side wall secured on its outside to the inside surface of the case and encompassing the mouth of the third motor.

4. A rocket package containing a rocket for use within the earth's atmosphere, comprising an elongate rocket bearing tube containing releaseable tube detent means and a rocket, said rocket including a case generally cylindrical in transverse section, having a relatively thin body with a forwardly-opening, warhead-receiving mouth at its forward end and, at its rear end, a shoulder of relatively heavy section and a neck extending axially rearwardly from said shoulder, said shoulder having a circumferential bearing surface defining a race-way channel arcuate in longitudinal section with respect to the rocket and circular in a section transverse with respect to the rocket and perpendicular to the long axis of the rocket; and an annular motor mounted on the outside of said neck and abutting a radial face of said shoulder, said motor having at least one pair of exhaust ports with the two ports of a pair located on diametrically opposite sides of the rocket casing and positioned so that a plane drawn perpendicular to the thrust axis of one of said ports of a pair and passing through the long axis of said rocket is also perpendicular to the thrust axis of the other of said ports of said pair, said ports being oriented so that the thrust direction of one of said ports of said pair will be in a direction opposite to the thrust direction of the other of said ports when the rocket is viewed from an end, and containing a spin charge.

5. In a spin rocket having a warhead at one end and an axially directed main thrust nozzle at its other end, the improvement comprising a propellant motor within said rocket adjacent and forward of the said thrust nozzle; a tubular propellant charge within said propellant motor, with a central axial bore; a sustainer motor within said rocket adjacent and forward of the propellant motor; a sustainer charge within said sustainer motor, said sustainer motor having a rearwardly, axially projecting sustainer nozzle extending within the compass of the propellant charge; a sustainer nozzle extender primer fire tube on said sustainer nozzle, said tube having outwardly directed ports through its wall and terminating axially forwardly of the thrust nozzle; a primer cartridge slidably mounted in said tube, and a resilient plug connected to said primer cartridge and mounted in the said thrust nozzle.

6. A rocket package comprising an elongate rocket bearing tube; releaseable tube detent means in said bearing tube; a rocket rotatably mounted in said bearing tube, and rocket detent means on said rocket cooperative with the detent means in said bearing tube to permit spinning of said rocket, said tube and rocket detent means comprising an axially shiftable sleeve having ball caging slots; biasing means urging said sleeve axially rearwardly with respect to the head of the rocket; a circumferential channel-defining surface in the outer wall of the rocket near the rear thereof; balls, riding in said circumferential channel and extending into the ball caging slots of said sleeve, and shoulder means in said tube radially outwardly of said sleeve and providing a ball release space, located axially forwardly of the ball caging slots of the sleeve when said sleeve is in its normally rearwardly biased position, and said rocket being generally cylindrical and having a motor having ports directed chordally in a plane perpendicular to the long axis of said rocket and a spin charge in said motor, said motor being adapted to impart a rotary motion to said rocket.

7. A rocket package comprising an elongate rocket bearing tube; releaseable tube detent means in said bearing tube; a spin rocket having a warhead at one end and an axially directed main thrust nozzle at its other end, rotatably mounted in said bearing tube, and rocket detent means on said rocket, cooperative with the detent means in said bearing tube to permit spinning of said rocket in place axially of said tube, said rocket having a propellant motor within said rocket adjacent and forward of the said thrust nozzle; a tubular propellant charge within said propellant motor, with a central axial bore; a sustainer motor within said rocket adjacent and forward of said propellant motor; a sustainer charge within said sustainer motor, said sustainer motor having a rearwardly, axially projecting sustainer nozzle extending within the compass of the propellant charge; a sustainer nozzle extender primer fire tube on said sustainer nozzle, said tube having outwardly directed ports through its wall and terminating axially forwardly of the thrust nozzle, and a primer cartridge slidably mounted in said tube.

References Cited by the Examiner

UNITED STATES PATENTS

| | | | |
|---|---|---|---|
| 1,102,653 | 7/1914 | Goddard | 102—49 |
| 2,726,576 | 12/1955 | Musser | 89—1.5 |
| 2,776,623 | 1/1957 | Bonner | 102—49 |
| 2,871,762 | 2/1959 | Schmued | 89—1.7 |
| 2,989,919 | 6/1961 | Engbarg et al. | 102—49 X |
| 3,000,306 | 9/1961 | Wenzel et al. | 102—49 |
| 3,092,770 | 6/1963 | Shoemaker | 102—49 |

FOREIGN PATENTS 1,003,758   11/1951   France.

BENJAMIN A. BORCHELT, *Primary Examiner.*

SAMUEL W. ENGLE, *Assistant Examiner.*